Nov. 15, 1966 D. C. WHITTLEY 3,285,537

VERTICAL TAKE OFF AND LANDING AIRCRAFT

Filed March 22, 1966 2 Sheets-Sheet 1

INVENTOR:
DONALD CHARLES WHITTLEY
BY: Cavanagh & Norman

Nov. 15, 1966   D. C. WHITTLEY   3,285,537
VERTICAL TAKE OFF AND LANDING AIRCRAFT
Filed March 22, 1966   2 Sheets-Sheet 2

INVENTOR:
DONALD CHARLES WHITTLEY
BY: Cavanagh & Norman 3,285,537
VERTICAL TAKE OFF AND LANDING AIRCRAFT
Donald Charles Whittley, Islington, Ontario, Canada, assignor to The De Havilland Aircraft of Canada, Limited
Filed Mar. 22, 1966, Ser. No. 536,351
7 Claims. (Cl. 244—12)

This application is a continuation-in-part of my copending application Serial No. 426,602, filed Jan. 19, 1965, now abandoned.

This invention relates to a vertical take-off and landing aircraft hereinafter referred to as a VTOL aircraft having an external plenum augmenter.

Vertical thrust augmenters for VTOL aircraft have been provided heretofore by means of vertical thrust devices in wing structure. In providing such devies sufficient vertical thrust must be provided in a VTOL type of craft to overcome dead weight. For reasons of safety it is usual to provide same in multiple form whereby the failure of one thrust motor will not give rise to instability or insufficient vertical thrust from the remainder of the engines. The wing structure during vertical ascent and descent in a VTOL type class of aircraft contributes to dead weight and it is required solely for desired flight characteristics at forward flight speeds which depend upon air foil characteristics for lift.

It is an object of this invention to provide vertical thrust devices associated with fuselage structure in such manner as to enable an external augmenting thrust to be developed about the fuselage downwardly, thus to avoid undue interference with cargo and cabin space in the aircraft and to enable a substantial saving in wing structure and size thereof, thus to limit the later essentially to that necessary for aerodynamic flight characteristics at forward flight speeds of the air foil section.

Another object of the invention is to provide a VTOL jet aircraft having two vertical thrust engines substantially forward of the fuselage and delivering gases rearwardly through a side plenum tube for each adapted to project thrust gases externally of the fuselage and downwardly over the lower outer surfaces thereof in combination with controllable shroud means overlying the lower external surfaces of said fuselage and moveable to provide suitable shrouding inducting secondary gases downwardly to effect an augmented vertical thrust component during vertical take off, and in association with said fuselage, a forward flight thrust fan engine and thrust tube therefor located effectively rearwardly in the upper regions of said fuselage and diverter valving associated therewith and with an intermediate longitudinal plenum whereby said intermediate plenum blasts gases downwardly below the fuselage longitudinal axis or center line and said side plenums augment same with air inducted thereby.

Other objects of the invention will be appreciated by a study of the following specification taken in conjunction with the accompanying drawings, wherein.

Figure 1:
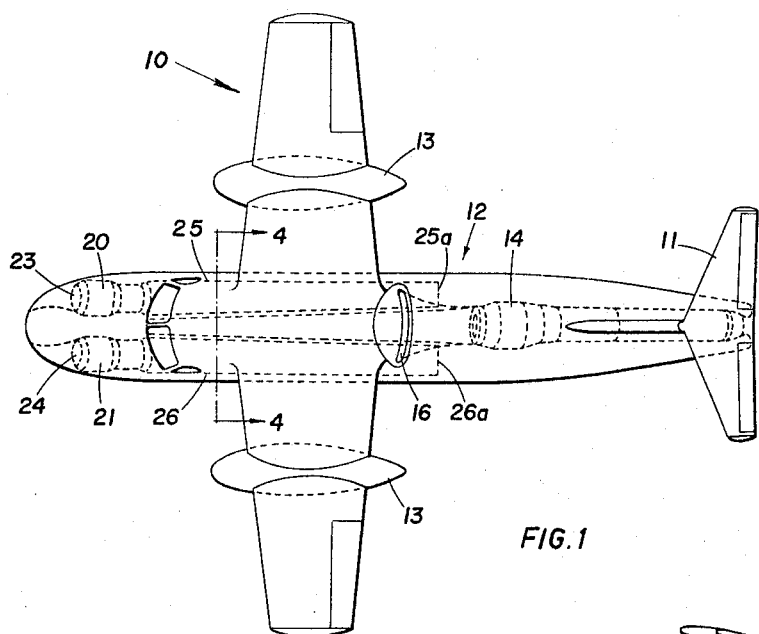
FIGURE 1 is a plan view of a VTOL aircraft according to this invention revealing the plenum tube structure in chain lines.
Figure 2:
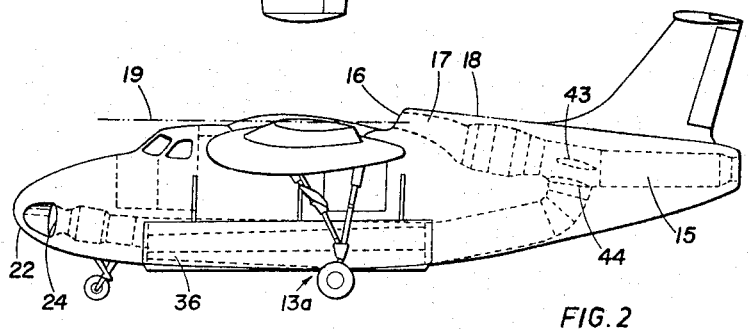
FIGURE 2 is an elevation of the aircraft of FIGURE 1 revealing the forward thrust tube and its association with the plenum tube shown in chain line.

In the drawings the aircraft of the invention is shown in plane view in FIGURE 1 wherein the wing structure 10 and stabilizer 11 on fuselage 12 are of a form and size necessary only to sustain the aircraft at design loading at substantially cruising speed. Wing pods 13 are adapted to carry fuel and to enclose retractable landing gear 13a. A main forward thrust engine of the turbo jet or turbo fan type 14 is located rearwardly in the fuselage in advance of main thrust tube 15 and is adapted to receive air inducted into the inlet opening or orifice 16 of the intake duct 17 provided by the outward fuselage hump portion 18 rising above the forward surfaces of the aircraft fuselage, that is above the line 19 in FIGURE 2. At cruising speed the aircraft of the invention is intended to maintain conventional flight characteristics under the forward trust of jet engine 14 alone.

Figure 3:
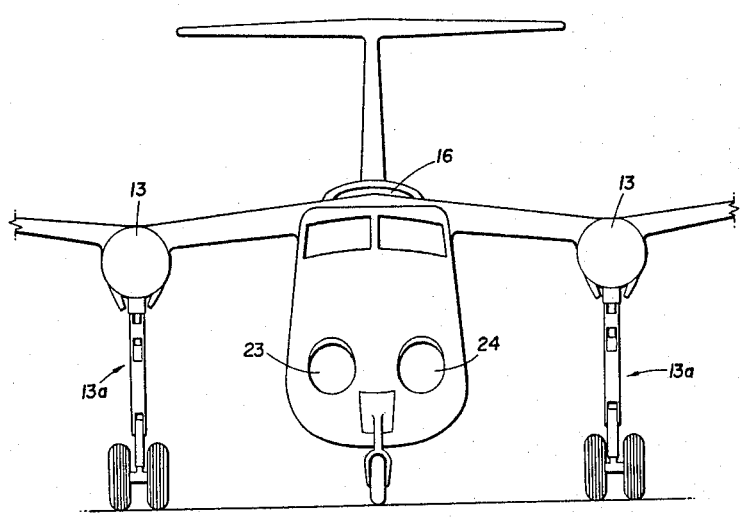
FIGURE 3 is a front elevation of the aircraft of FIGURE 1 revealing the inlet openings for the vertical thrust engines and the main thrust engine for forward flight.

The aircraft herein also embodies two turbo fan or turbo jet engines each of a thrust substantially equal to the thrust of engine 14 located forwardly as at 20 and 21 on the lower regions of the nose portion 22 of the fuselage 12 in association with inlet duct openings 23 and 24 therefor (FIGURE 3). Each engine 20, 21 serves an associated plenum 25, 26 converging in diameter rearwardly to closed ends 25a, 26a (FIGURE 1) each having, as revealed in FIGURE 4, a longitudinal slit opening 27 therein for exit of combustion gases tangentially downwardly in the direction of arrow X over the outer surfaces 28 of the under structure 29 of the fuselage. Each plenum 25 or 26 is in the form of a rearwardly tapered closed end tube converging rearwardly from said thrust engine 20 or 21 and in which the slit 27 is formed by folding the wall structure inwardly as shown in section at lip structure 30 in FIGURE 4, to space the surface 31 of the rolled-in lip closely in relation to the longitudinally extending edge 32 of the plenum side wall 33 so as to form an exit opening or slit 27 to direct the exit gases emerging therethrough substantially tangentially downwardly.

The downward curtain of exhaust thrust gases will cling to surfaces 28 and entrain surface air therewith to be turned downwardly by the downward blast from main thrust engine plenum 34 and central longitudinal slit 34a and upon conjoining with a corresponding thrust curtain from the other underside surface of the fuselage will provide a combined downward three part thrust component Y directly below the longitudinal center of the fuselage.

The creation of a downward thrust by the use of longitudinally slit side plenums as described herein is greatly assisted by the provision of shrouding structure 34a associated with the side plenums to define the side and under surface of the fuselage for a substantial portion of the length thereof and adapted to occlude the plenum slits. Shroud structures 35 provide a clean fuselage geometry when in the closed position as indicated in the left hand side of FIGURE 4 as contrasted with the open position indicated in the right hand side of that figure.

The shroud structure 35 in each case embodies a shroud flap 36 hinged by a plurality of suspension arms 37 from the fuselage frame posts 38 as at 39, moveable downwardly and inwardly by the double acting hydraulic or pneumatic cylinders 40 fixed to the aircraft floor frame 41 and pivotally connected by the piston arm thereof at a point 42 on the suspension arm 37. In this way a gap is created between the shroud flap 36 and the fixed under surface 38 of the frame structure of the fuselage whereby air is inducted along the path of the arrow Z past the suspension arms 37. The gap for shrouding and controlling the induction of excess air is greatly variable and controllable by the pilot. A wide shroud gap will result in little downward thrust component during idling of the three engines. As the gap is closed and the engines speeded up, the thrust will maximize to a predetermined gap determined by geometry and characteristics of the aircraft itself.

Figure 5:
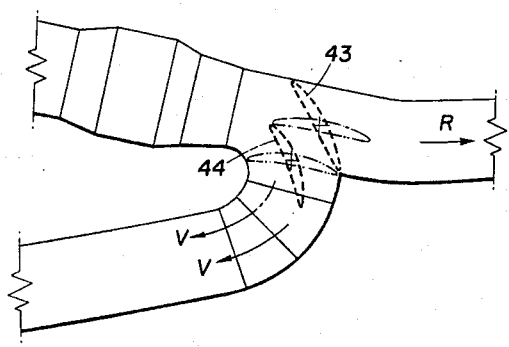
FIGURE 5 is an illustration of diverter valving for diverting thrust gases from the main forward thrust jet tube to the intermediate plenum.
Figure 4:
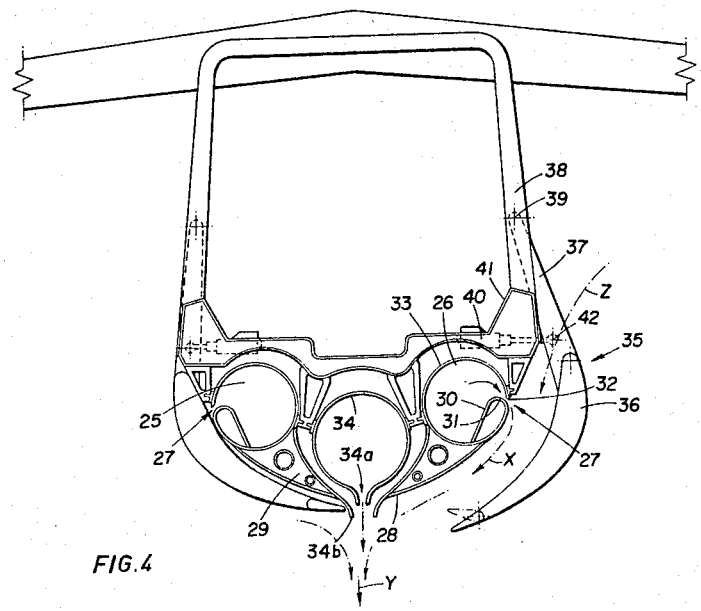
FIGURE 4 is a transverse section on line 4—4 of FIGURE 1.

In FIGURE 4 center tube 34 is used for providing by way of its central longitudinal slit 34a a downward blast of gases delivered from the main thrust engine 14 diverted by tandem diverter valve structure 43, 44 moveable from a rear thrust position as indicated by thrust line R to a vertical thrust position indicated by gas flow arrows V in FIGURE 5.

Having regard to the foregoing, it will be apparent that the invention generally concerns a vertical take off and landing class of aircraft operative in such function by virtue of a different concept of fuselage function and wing co-ordination and co-operation than heretofore. Thus the wing structure required is that necessary only to sustain the aircraft at substantial forward speeds. The vertical lift engines contribute to sustain the dead weight of the craft up to substantially cruising speed and thus it is possible to design an aircraft according to this invention with small lift sustaining wings. This contributes to the rigidity of the craft and its ability to achieve higher speeds than would be available with wings sufficiently large to sustain the same at lower speeds. At least three engines are provided, two for vertical lift with associated plenums providing longitudinally extending downwardly tangential slits having associated therewith controllable shroud structures adapted to form a gap with the side and under surfaces of the fuselage to affect the vertical lift by pumping large quantities of excess air inducted by exhaust of gases from the plenums. The main thrust engine and thrust tube are preferably located rearwardly in the fuselage structure and connect with the vertical lift intermediate plenum by valve means whereby the failure of any one of the engines may be compensated for under emergency conditions by increasing the thrust of the main engine since the moment of the imbalance is small due to the substantial alignment of the resultant blast of all engines directly below the longitudinal center line of the aircraft fuselage.

A small keel 34b is fitted to the underside of the fuselage, on the center line, to deflect the jet downward if the opposite engine should fail. Location of the engines near the center line eliminates any large rolling moments due to lift engine failure such as would occur with wing mounted lift pods. In these various ways the configuration shown takes care of the most important aspects of safety in the event of an engine failure.

The invention provides a method of mixing the primary, high velocity jet with a secondary flow and this results in a relatively low velocity exit. Since noise of a jet is proportional to the jet velocity to the power of 8 or 10, then the low velocity exhaust generates much less noise.

However, the high velocity jet is still present within the shrouded passage. The noise of this jet is reduced because of the reduction in shear velocity brought about by the secondary flow. Also, the frequency of sound generated is higher than usual because of the narrow jet width and this type of noise is more easily attenuated by the surrounding structure (fuselage and shroud). In addition to this, corrugations may be provided in the jet nozzle to reduce the noise level of the primary jet at source.

Basically, the lift engines do not have an excessively high jet velocity to start with and thus sound levels of the proposed system are at an acceptable level for both military and civil operation. Design compromise favors sound reduction rather than increase in thrust augmentation. It is desirable to complete transition from hover mode to flight mode as soon as possible in order to keep fuel consumption to a minimum. This should take place within 5,000 ft. of the point of departure and at this point the propulsion engine will be at a high power level. The underside of the fuselage is preferably constructed with a double skin or appendage which forms both a heat shield and a sound attenuator.

Most jet VTOL experimental aircraft have encountered unfavorable characteristics close to the ground surface. The external augmenter herein gives a positive ground effect at the point of take-off with little, if any, lift loss in free hovering flight. Close to the ground, the entrained air will create some "negative" pressures on the underside of the wing, but this is more than offset by the positive ground effect acting on the fuselage.

A typical aircraft herein is assumed to weigh, for example, 10,000 lb. with two lift engines mounted in the nose. The central rearward engine is used for propulsion or lift, whereas the two forward engines provide lift for take-off and landing only. All engines operate at approximately two-thirds power for hovering—this allows for failure of one engine. Wing loading would be approximately fifty pound per square foot or more. Conventional control means fed by compressor bleed air provide stability as required during hovering.

I claim:

1. A vertical take off and landing aircraft comprising: a fuselage; wing structure adapted to sustain said fuselage in flight at a forward cruising speed; a first jet engine and a rearwardly extending jet tube in said fuselage adapted to propel said aircraft at cruising speed; at least one other jet engine in said fuselage; two side plenums extending longitudinally in the lower forward regions at least of said fuselage and each having a longitudinal slot for the tangentially downward escape of gases therefrom over under surfaces of said fuselage; means connecting said other engine to said plenums and retractable shroud flap means for each plenum defining when closed therewith substantially conventional fuselage contours for crusing flight under the propulsion of said first engine and when open a control for the induction of excess air augmenting the thrust from said slots.

2. A vertical take off and landing aircraft comprising: a fuselage; wing structure adapted to sustain said fuselage in flight at a forward cruising speed; a first jet engine and a rearwardly extending jet tube in said fuselage adapted to propel said aircraft at cruising speed; a central plenum in said fuselage having a longitudinal slot therein in parallel spaced relation below the longitudinal axis of said fuselage; diverter valve means for diverting thrust from said engine to said central plenum to provide a downward blast from the slot thereof; at least one other jet engine in said fuselage; two side plenums extending longitudinally in the lower forward regions at least of said fuselage and each having a longitudinal slot for the tangentially downward escape of gases therefrom over under surfaces of said fuselage and means connecting said other engine to said plenums.

3. A vertical take off and landing aircraft as claimed in claim 2 and shroud flap means for each side plenum defining when closed therewith substantially conventional fuselage contours for cruising flight under the propulsion of said first engine and when open a control for the induction of excess air augmenting the thrust from said slots.

4. A vertical take off and landing aircraft as claimed in claim 2 and keel-like structure on the under surface of said fuselage extending longitudinally thereof about the longitudinal slot in said central plenum and adapted to direct gases moving downwardly over said under surface of the fuselage from the side plenums whereby the over turning moment effected by said gases is substantially a minimum.

5. A vertical take off and landing aircraft as claimed in claim 2 and a separate jet engine for each side plenum, each of a horse power and thrust substantially equal to the horse power and thrust of said first jet engine; keel-like structure defining an exit opening for the longtitudinal slot of said central plenum; shroud flap means for each side plenum defining when closed therewith substantially conventional fuselage contours for cruising flight under the propulsion of said first engine alone and when spaced from said fuselage providing a gap for the induction of excess air augmenting the thrust of gases downwardly from the longitudinal slit of each said plenum, following over the under surface of the fuselage and directed downwardly by said keel-like structure to conjoin with the central downward blast from said central plenum slot close to the longitudinal axis of the fuselage at substantially minimum over turning moment whereby the aircraft remains stable against over turning moment in the event of failure of an engine of one of said side plenums and the thrust thereof may be replaced by diverting a portion of the thrust from the first jet engine by way of said diverter valving means to said central plenum and thrust of said first engine increased.

6. A vertical take off and landing aircraft as claimed in claim 2 in which said first jet engine is located in upper regions of the fuselage; and an engine air intake opening located substantially upwardly and rearwardly of said fuselage above forward surfaces thereof.

7. A vertical take-off and landing aircraft having an elongated fuselage structure and associated wing elements therefor and comprising: a forward thrust generator for moving said aircraft in forward flight by aerodynamic lift; means for generating a curtain of thrust gases and directing same by Coanda effect exteriorly of said fuselage struture over a substantial portion of the length of both side surfaces thereof in a direction downwardly over undersurfaces of the fuselage whereby said curtains of thrust gases resolve into a single thrust curtain projecting downwardly directly below the longitudinal axis of the fuselage; retractable shroud means on each side of said fuselage having cruising speed outer fuselage contours and extending over side and undersurfaces of said fuselage over said curtains of thrust gases to establish with said fuselage surfaces a through gap accommodating said thrust curtain thereby to augment said thrust curtains by the induction of supplementary air therewith through said gap; means conecting said shroud means to said fuselage for controllably moving the same from a gap forming extended position to a fully retracted position at which the outer contours of said shroud means define the exterior contours of the fuselage structure under flight conditions utilizing solely said forward thrust generator.

References Cited by the Examiner
UNITED STATES PATENTS

| | | | |
|---|---|---|---|
| 2,918,233 | 12/1959 | Lippisch | 244—23 |
| 3,053,482 | 9/1962 | Matthews et al. | 244—23 |
| 3,073,548 | 1/1963 | Marsh | 244—12 |
| 3,117,643 | 1/1964 | Cockerell | 244—23 X |
| 3,124,322 | 3/1964 | Cockerell | 244—12 |
| 3,148,848 | 9/1964 | Price | 244—23 |

FERGUS S. MIDDLETON, *Primary Examiner.*

A. E. CORRIGAN, *Assistant Examiner.*